United States Patent
Miller et al.

(10) Patent No.: US 6,404,435 B1
(45) Date of Patent: Jun. 11, 2002

(54) METHOD AND APPARATUS FOR THREE-DIMENSIONAL ALPHANUMERIC CHARACTER ANIMATION

(75) Inventors: Paul Miller, Tewksbury; Brian Paul, Lowell, both of MA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/054,763

(22) Filed: Apr. 3, 1998

(51) Int. Cl.[7] .............................................. G06T 11/00
(52) U.S. Cl. ...................................... 345/468; 345/128
(58) Field of Search ................................ 345/423, 442, 345/467–474, 17, 26, 10, 194, 418, 947, 326, 25, 128, 141, 327, 328, 419, 475; 315/365; 379/88.13; 341/107

(56) References Cited

U.S. PATENT DOCUMENTS

| | | | | |
|---|---|---|---|---|
| 4,305,131 A | * | 12/1981 | Best | |
| 4,600,919 A | * | 7/1986 | Stern | 340/725 |
| 4,888,583 A | * | 12/1989 | Ligocki et al. | 340/729 |
| 4,930,092 A | * | 5/1990 | Reilly | 364/522 |
| 5,097,411 A | * | 3/1992 | Doyle et al. | 395/600 |
| 5,155,822 A | * | 10/1992 | Doyle et al. | 395/400 |
| 5,307,451 A | * | 4/1994 | Clark | 395/127 |
| 5,307,456 A | * | 4/1994 | MacKay | 395/154 |
| 5,361,386 A | * | 11/1994 | Watkins et al. | |
| 5,421,589 A | * | 6/1995 | Monroe | 273/437 |
| 5,455,902 A | * | 10/1995 | Ellson et al. | 395/152 |
| 5,488,684 A | * | 1/1996 | Gharachorloo et al. | |
| 5,544,291 A | * | 8/1996 | GilleY et al. | 395/123 |
| 5,555,356 A | * | 9/1996 | Scheibl | 395/134 |

(List continued on next page.)

FOREIGN PATENT DOCUMENTS

EP  EP 0569758  * 11/1993

OTHER PUBLICATIONS

Miller et al., United States Serial Number 09/293,497 Apr. 15, 1999.*
Reinhard, Klein, "Multiresolution Representations for Surfaces Meshes Based on the Vertex Deimation Method", Computer & Graphics, vol. 22, No. 1, 1998, pp. 13–26.
Doenges, Peter et al., MPEG–4 Audio/Video and synthetic graphics/audio for mixed media", signal Processing Image Communications 9, 1997, pp. 433–463.
Elliot, Steven, et al., "Inside 3D Studio MAX 2: vol. 1, 1998, 99. 287–340.

*Primary Examiner*—Almis R. Jankus
*Assistant Examiner*—G. F. Cunningham
(74) *Attorney, Agent, or Firm*—Peter J. Gordon

(57) ABSTRACT

A character is represented in a character generator as a set of polygons. The character may be manipulated using three-dimensional animation techniques. A code for a character may be used to access a set of curves defining the outline of the character. This set of curves is transformed into a set of polygons. The set of polygons may be rendered as a three-dimensional object. The set of polygons may be created by converting the curves into sets of connected line segments and then tessellating the polygon defined by the line segments. Animation properties are represented using a normalized scale over time. Animation may be provided in a manner that is independent of the spatial and temporal resolution of the video to which it is applied. Such animation may be applied to characters defined by a set of polygons. A user interface for editing a character string may provide two alternate displays. A first display allows a user to input and view any desired portion of the character string for the purpose of editing. A second display allows a user to view how the character string appears at a selected point in time during a titling effect for the purpose of animation. In both displays, the text is displayed in a three-dimensional form. This interface may be combined with a timeline editing interface for editing an associated video program, or other user interface, to permit layering of titling effects and adjustment of animation properties and timing.

36 Claims, 8 Drawing Sheets

U.S. PATENT DOCUMENTS

| | | | | |
|---|---|---|---|---|
| 5,602,979 A | * | 2/1997 | Loop | 395/123 |
| 5,606,652 A | * | 2/1997 | Silverbrook | |
| 5,630,043 A | * | 5/1997 | Uhlin | 395/174 |
| 5,692,117 A | * | 11/1997 | Berend et al. | 395/152 |
| 5,745,666 A | * | 4/1998 | Gilley et al. | 395/128 |
| 5,745,710 A | * | 4/1998 | Clanton, III et al. | 395/327 |
| 5,771,167 A | * | 6/1998 | Gomi et al. | 364/140 |
| 5,805,783 A | * | 9/1998 | Ellson et al. | 395/168 |
| 5,826,102 A | * | 10/1998 | Escobar et al. | 395/806 |
| 5,852,672 A | * | 12/1998 | Lu | 382/154 |
| 5,867,172 A | * | 2/1999 | Fujisawa et al. | 345/467 |
| 5,963,209 A | * | 10/1999 | Hoppe | |

* cited by examiner

```
PROC VisitNode (Node n)

Property p;

FOR EACH p in n's list DO                                    80
        Push p onto its corresponding property stack
    END DO
                                        82
    ProcessThisNode (layout or draw)
                                84
    FOR EACH child (c) o n DO
                        86
        VisitNode (c);
    END DO
                                      88
    FOR EACH p in n's property list DO                  90
        Pop p's corresponding property stack
    END DO
END PROC
```

FIG. 5

TEXT BOX IN EDIT MODE

TEXT BOX IN ROLL-ANIMATING MODE

METHOD AND APPARATUS FOR THREE-DIMENSIONAL ALPHANUMERIC CHARACTER ANIMATION

FIELD OF THE INVENTION

The present invention is related to titling or character generation for television, film, video and multimedia.

BACKGROUND

Character generators are systems that are used to add text, such as titles and credits, to video programs, such as a television, film, video and other multimedia programs. Titles often are designed to roll or crawl over a screen, commonly called scrolling. Other effects commonly are performed. Some character generators focus on providing real-time multichannel mixing of titling and video. Some provide more advance creative features which are not producible in real-time.

Most computer systems which render alphanumeric character strings, such as word processors or character generators generally represent the character string as a set of characters, for example by using a tree or an array. Each character is defined by a code that refers to a bit-mapped image or raster image of the character. Alternatively, the code may refer to a set of curves defining the outline of the character which is converted to a bit-map or raster image. The data structure representing the character string is processed to layout each character in a plane according to the font, the character metric, the character size and the spacing between characters. The characters are then drawn in the image by placing the image of the character at a designated position in the plane. The plane is then displayed, possibly with some spatial transformation. Because character generators generally use bit-mapped images or raster images of text to add characters to video, spatial transformations performed on the characters may result in visual artifacts that are undesirable, such as pixellation.

SUMMARY

A character is represented in a character generator as a set of polygons and may be manipulated using three-dimensional animation techniques. A code for a character may be used to access a set of curves defining the outline of the character. This set of curves is transformed into a set of polygons. The set of polygons may be rendered as a three-dimensional object. The set of polygons may be created by converting the curves into sets of connected line segments and then tessellating the polygon defined by the line segments.

Animation properties may be represented using a normalized scale over time to allow animation to be provided in a manner that is independent of the spatial and temporal resolution of the video to which it is applied. Such animation may be applied to characters defined by a set of polygons. Various three-dimensional spatial transformations, lighting effects and other colorizations may be provided.

A user interface for editing a character string may provide two alternate displays. A first display allows a user to input and view any desired portion of the character string for the purpose of editing. A second display allows a user to view how the character string appears at a selected point in time during a titling effect for the purpose of animation. In both displays, the text is displayed in a three-dimensional form. This interface may be combined with a timeline editing interface for editing an associated video program, or other user interface, to permit layering of titling effects and adjustment of animation properties and timing.

Accordingly, in one aspect, a computer-implemented method and computer system generates a representation of an alphanumeric character as a set of polygons defining a surface of the alphanumeric character. An input providing an indication of a character code identifying the alphanumeric character is received. Curves defining an outline of the alphanumeric character are identified according to the character code. A set of polygons defining a surface of the alphanumeric character are generated from the identified curves for the character code.

In one aspect, a computer-readable medium has computer-readable signals stored thereon defining a data structure. The data structure defines a plurality of polygons having interconnected vertices and defining a surface of an alphanumeric character. This medium may be produced by the process described above for generating the set of polygons, and by storing the set of polygons on the computer-readable medium.

In another aspect, a method and computer system produces three-dimensional animation of alphanumeric characters. An input defining an outline of the alphanumeric character is received. Properties are associated with the character and a period of time defining three-dimensional attributes of the character over the period of time. A set of polygons defining a surface of the character is generated using the received outline and properties. The set of polygons is rendered according to the properties on a display over the period of time.

In one embodiment of these aspects, the set of polygons is generated by converting the curves into a set of connected line segments and tessellating the set of connected line segments to obtain the set of polygons.

In another aspect, a graphical user interface for defining three-dimensional alphanumeric character generation associated with a video program includes a timeline generator for displaying a timeline representing of a duration of the video program, and illustrating a track of the video program and a track for associated alphanumeric characters related in time to the video program. An input receives indications from the user regarding the duration and time sampling of title elements on the timeline.

In another aspect, a graphical user interface for displaying three-dimensional animated alphanumeric characters receives an indication of an alphanumeric character. In response to a receipt of an indication of an alphanumeric character, a set of polygons representing the alphanumeric character is generated according properties associated with the alphanumeric character. The set of polygons is rendered on a display.

BRIEF DESCRIPTION OF THE DRAWING

In the drawing,

FIG. 5 is a flow chart describing how the data structure shown in FIG. 3 is processed to determine properties associated with each node in the structure;

DETAILED DESCRIPTION

The present invention will be more completely understood through the following detailed description which should be read in conjunction with the attached drawing in which similar reference numbers indicate similar structures. All references cited herein are hereby expressly incorporated by reference.

Figure 1:
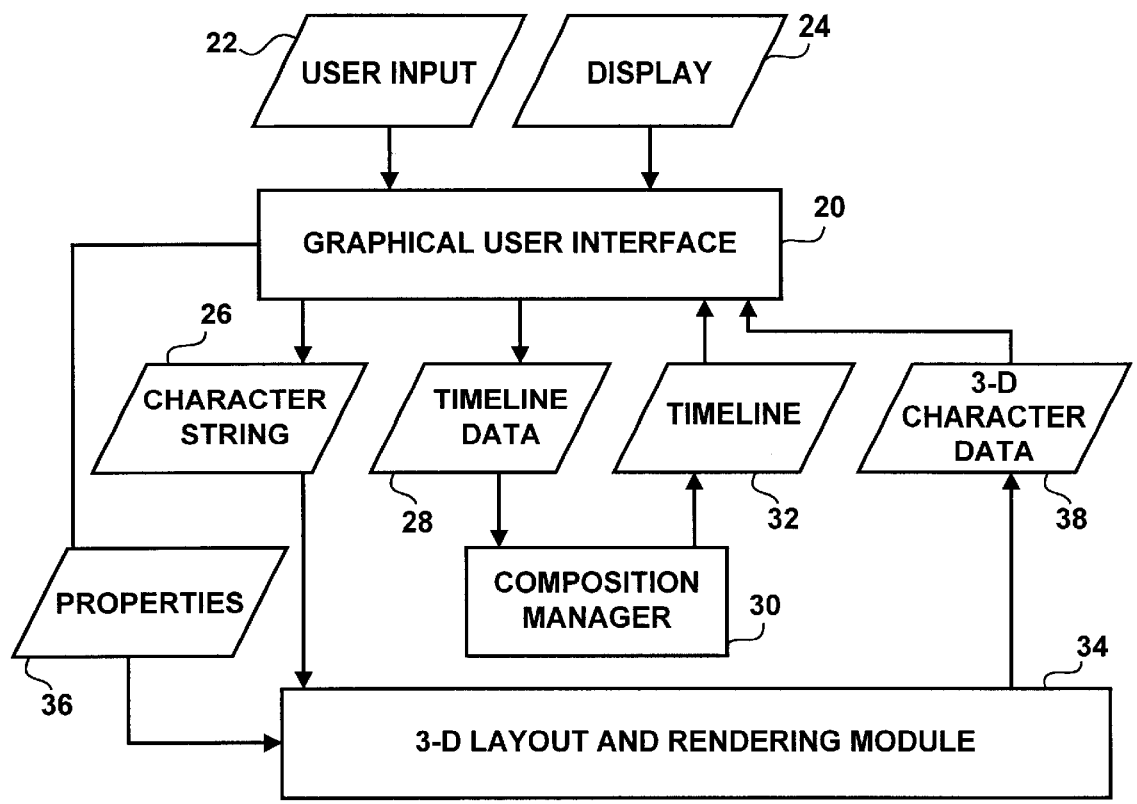
FIG. 1 is a data flow diagram of a system for three-dimensional character generation in combination with a video editing system in one embodiment.

Referring now to FIG. 1, a character generator may be used in conjunction with, or independently from, a video editing system. A character generator receives alphanumeric character input from which image data is generated to be applied to the video data. An alphanumeric character is a graphical symbol defining a letter, number, punctuation or other symbol in a written language. In an embodiment shown in FIG. 1, the character generator is provided in conjunction with a video editor, which enables titling effects to be created by an editor along with a video program. In this embodiment, the character generator and video editing system have a graphical user interface 20 which receives user input 22 in order to edit a video program and to apply titling effects to the video stream.

The graphical user interface generates display data 24 for placement, for example, on a computer display (not shown). The display data may include video data based on images of a video program in which titling effects are applied. Various user interfaces, such as a timeline or menus, in combination with a pointing device or other input device, enable a user to define the input 22 applied to the graphical user interface 20. The user may input information such as an alphanumeric character string 26 to be used in a titling effect applied to the video data. Manipulations to the timeline, as shown at 28, are provided to a video editing system 30 which maintains a representation of the video program being edited, commonly called a composition. The video editing system outputs data representing the timeline as indicated at 32 which is processed by the graphical user interface to be added to the display data 24. The alphanumeric character string is input to a three-dimensional layout and rendering module 34. A character may be associated with properties 36 defining characteristics of the character such as a font, rotation, position, size, kerning and lighting. The three-dimensional layout and rendering module 34 uses the properties 36 and the alphanumeric character string 26 to generate a set of polygons defining the characters. The sets of polygons are rendered to produce three-dimensional character data 38 which is included in the display data 24 through the graphical user interface 20.

Figure 2:
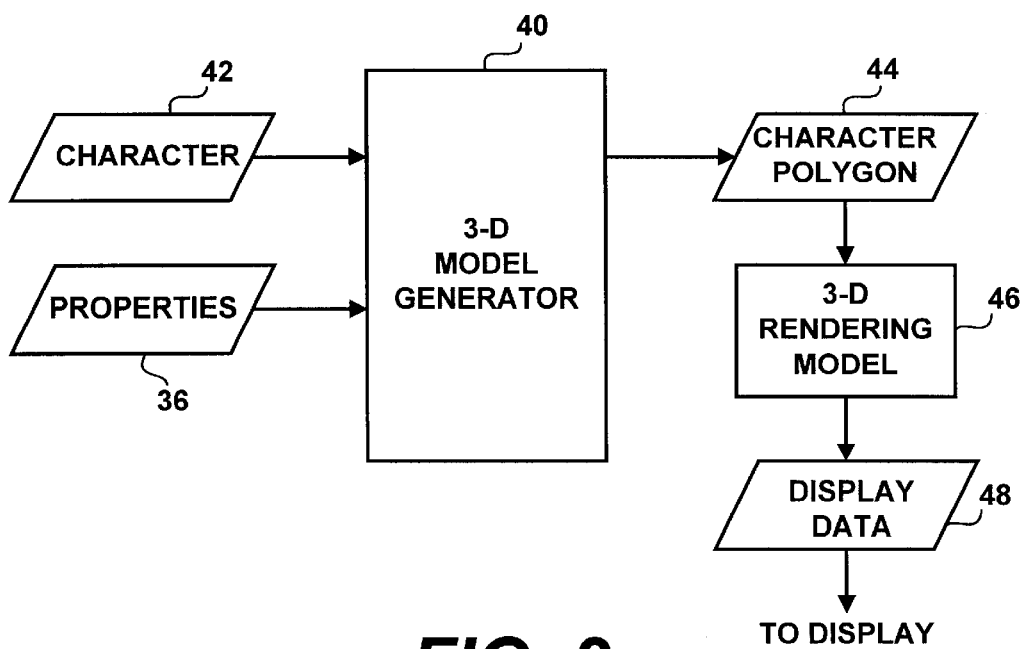
FIG. 2 is a more detailed data flow diagram of a system for generating and rendering three-dimensional models of alpha numeric characters.

Additional details of the three-dimensional layout and rendering module 34 are shown in FIG. 2. FIG. 2 illustrates a three-dimensional model generator 40 which receives an indication of an alphanumeric character 42 and the properties 36. There may be one or more alphanumeric characters 42 in the alphanumerical character string 26 in FIG. 1, which are rendered separately by the module shown in FIG. 2. Three-dimensional model generator 40 outputs a set of polygons 44 that defines the alphanumeric character in three-dimensions. This character is rendered using a three-dimensional rendering module 46 to produce the display data for the character 48. The display data for several characters is combined in a layout determined using standard techniques to produce the three-dimensional character data 38 in FIG. 1.

By representing a character as a set of polygons which is rendered in three-dimensions, rather than a raster image, several transformations may be performed on the character in real-time to provide a displayed output to the editor illustrating how the character appears in three-dimensions. Because the character is represented as a polygon, various pixellation or other visual artifacts are not created by the spatial transformations. The characters also may be animated and the animation may be defined in a resolution independent manner.

One embodiment of the system of FIG. 1 will now be described in connection with FIGS. 3–9. The system described herein creates a three-dimensional model which is rendered to produce the display data added to the image space. There are many ways to layout and to represent alphanumeric character strings, and the invention is not limited to those described herein. The following description provides an example implementation for representing a character as a set of polygons generated from a character code, font and other properties.

A computer system for implementing the system of FIGS. 1 and 2 as a computer program typically includes a main unit connected to both an output device which displays information to a user and an input device which receives input from a user. The main unit generally includes a processor connected to a memory system via an interconnection mechanism. The input device and output device also are connected to the processor and memory system via the interconnection mechanism.

It should be understood that one or more output devices may be connected to the computer system. Example output devices include a cathode ray tube (CRT) display, liquid crystal displays (LCD), printers, communication devices such as a modem, and audio output. It should also be understood that one or more input devices may be connected to the computer system. Example input devices include a keyboard, keypad, track ball, mouse, pen and tablet, communication device, and data input devices such as sensors. It should be understood that the invention is not limited to the particular input or output devices used in combination with the computer system or to those described herein.

The computer system may be a general purpose computer system which is programmable using a computer programming language, such as "C++," JAVA or other language, such as a scripting language or even assembly language. An example computer system is the Infinite Reality computer system from Silicon Graphics, Inc. The computer system may also be specially programmed, special purpose hardware. In a general purpose computer system, the processor is typically a commercially available processor, of which the series x86 and Pentium processors, available from Intel, and similar devices from AMD and Cyrix, the 680X0 series microprocessors available from Motorola, the PowerPC microprocessor from IBM and the Alpha-series processors from Digital Equipment Corporation, and the MIPS microprocessor from MIPS Technologies are examples. Many other processors are available. Such a microprocessor executes a program called an operating system, of which WindowsNT, IRIX, UNIX, DOS, VMS and OS8 are examples, which controls the execution of other computer programs and provides scheduling, debugging, input/output control, accounting, compilation, storage assignment, data management and memory management, and communication control and related services. The processor and operating system defines computer platform for which application programs in high-level programming languages are written.

A memory system typically includes a computer readable and writeable nonvolatile recording medium, of which a magnetic disk, a flash memory and tape are examples. The disk may be removable, known as a floppy disk, or permanent, known as a hard drive. A disk has a number of tracks in which signals are stored, typically in binary form, i.e., a form interpreted as a sequence of one and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk when processing is completed. A variety of mechanisms are known for managing data movement between the disk and the integrated circuit memory element, and the invention is not limited thereto. It should also be understood that the invention is not limited to a particular memory system.

It should be understood that invention is not limited to a particular computer platform, particular processor, or particular high-level programming language. Additionally, the computer system may be a multiprocessor computer system or may include multiple computers connected over a computer network. It should be understood that each module or step shown in the accompanying figures may correspond to separate modules of a computer program, or may be separate computer programs. Such modules may be operable on separate computers.

In one embodiment, an OpenGL software library (OpenGL is a registered trademark of Silicon Graphics, Inc.) which is accessible through an application program interface (API), is used to implement commands that specify objects and operations to produce interactive, three-dimensional applications. In a computer system which supports OpenGL, the operating system and application programs can make calls to the computer graphics system according to the standardized API without knowledge of the underlying hardware. The OpenGL standard provides a library of graphics manipulation commands for describing models of three-dimensional objects. The OpenGL standard is described in the *OpenGL Programming Guide,* Version 1.1 (1997), the *OpenGL Reference Manual,* Version 1.1 (1997), and *The OpenGL Graphics System: A Specification* (Version 1.0), by Segal and Akeley, all of which are hereby incorporated by reference in their entirety.

Figure 3:
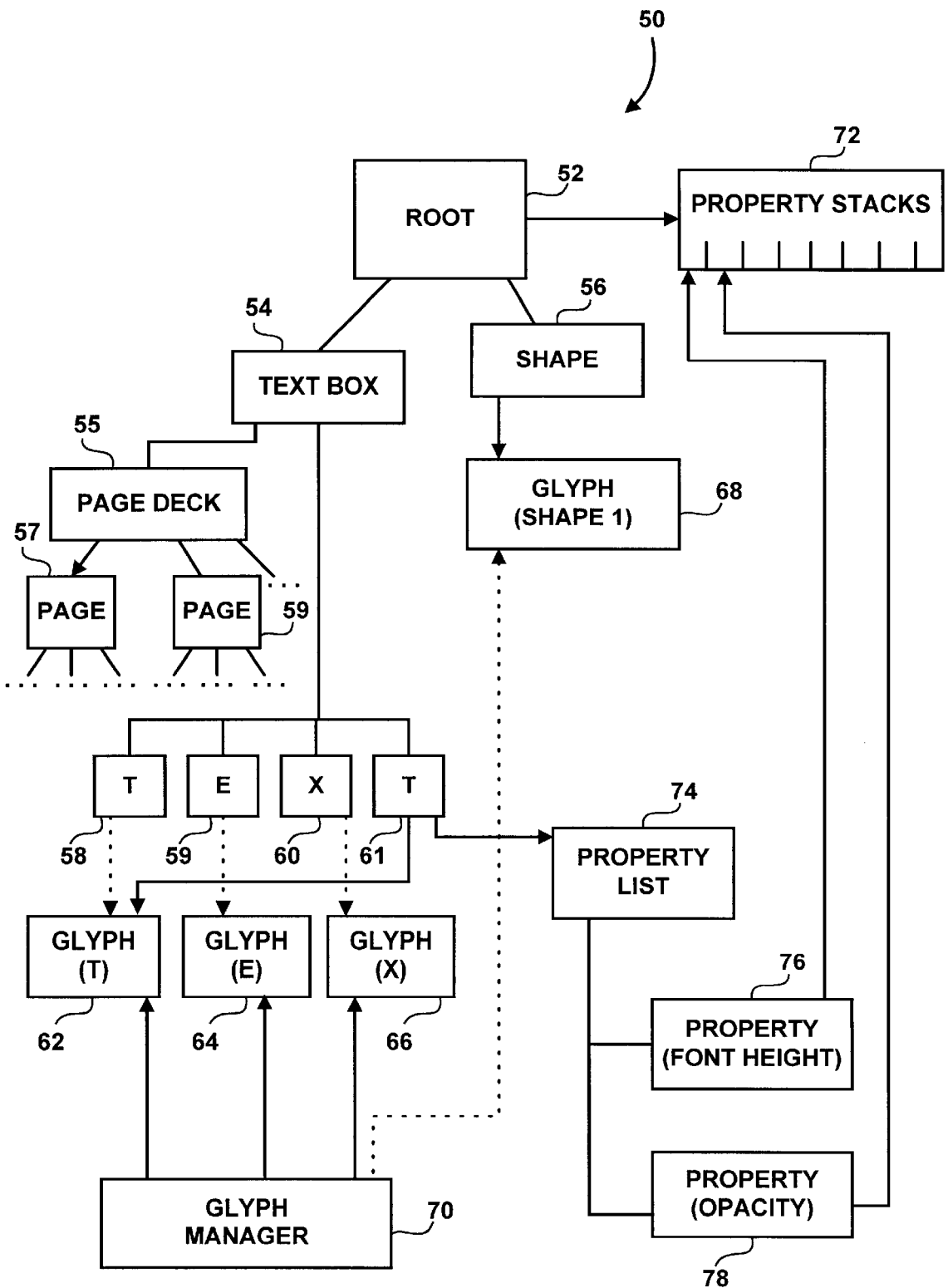
FIG. 3 is a graphical illustration of a relationship of data structures defining a titling effect to be applied to video.

Referring now to FIG. 3, in one embodiment a data structure which represents a titling effect to be applied to video is a scene graph. The implementation may be object oriented. The scene graph object may be implemented as a tree or other structure such as a list, array, etc. An example of such a tree is shown at 50 in FIG. 3. The tree has a root node 52. The root node has a collection of children nodes which may be, for example, a text box 54 or shape 56 or page deck 55. The root node also has associated with it a collection of property stacks which will be described in more detail below.

A shape object is any arbitrary closed two-dimensional shape, such as a rectangle, circle or triangle. Accordingly, a shape node 56 is represented by data defining the shape, such as a Bézier.

A text box object 54 is defined as a collection of characters, which may be representing using any data structure, such has a tree. A text box may be implemented to include other text boxes. A text box also has an associated property list, as described below.

Another kind of object is a page deck object 55. A page deck is a collection one or more pages 57, 59. A page may include other kinds of objects such as text boxes, shapes or other page decks. A page deck has a display method that displays its children one at a time. A child is selected according to a function of time.

Each character object, such as shown at 58, 59, 60 and 61, is represented by a character code and a property list. The character code may be an ASCII code defining the alphanumeric character or symbol.

Glyph objects, illustrated at 62, 64, 66 and 68, are dynamically created from character and shape objects according to a code for a character or shape object and associated properties. A glyph defines commands which may be used to render a character on a display. Glyphs for different characters, but having the same font name, profile, and rendering mode may be combined into glyph sets.

In one embodiment, a glyph is implemented as a display list in the OpenGL standard, which is created by rendering the set of polygons defining a character or shape, such as described below in connection with FIG. 5. By using a display list, three-dimensional rendering of a set of polygons may be accelerated by caching the display list for the character as a glyph. Such caching is maintained by a glyph manager 70.

The glyph manager 70 is a repository, such as a database or a data structure, that stores glyphs created for a combination of character code, font, profile, and rendering mode and a level of detail. Fonts with different style attributes that alter the outline of the character, such as bold and italic, are treated as separate fonts. The profile corresponds to beveling or other border properties that also alter the outline of the character. The rendering mode includes wire frame or non-wire frame rendering. The level of detail (LOD) represents a particular polygonal tessellation of the glyph. Glyphs having the same font, profile, rendering mode and LOD are combined into a glyph set. A glyph set may include a glyph for characters in a specified font with a specified profile, rendering mode and level of detail.

Figure 4:
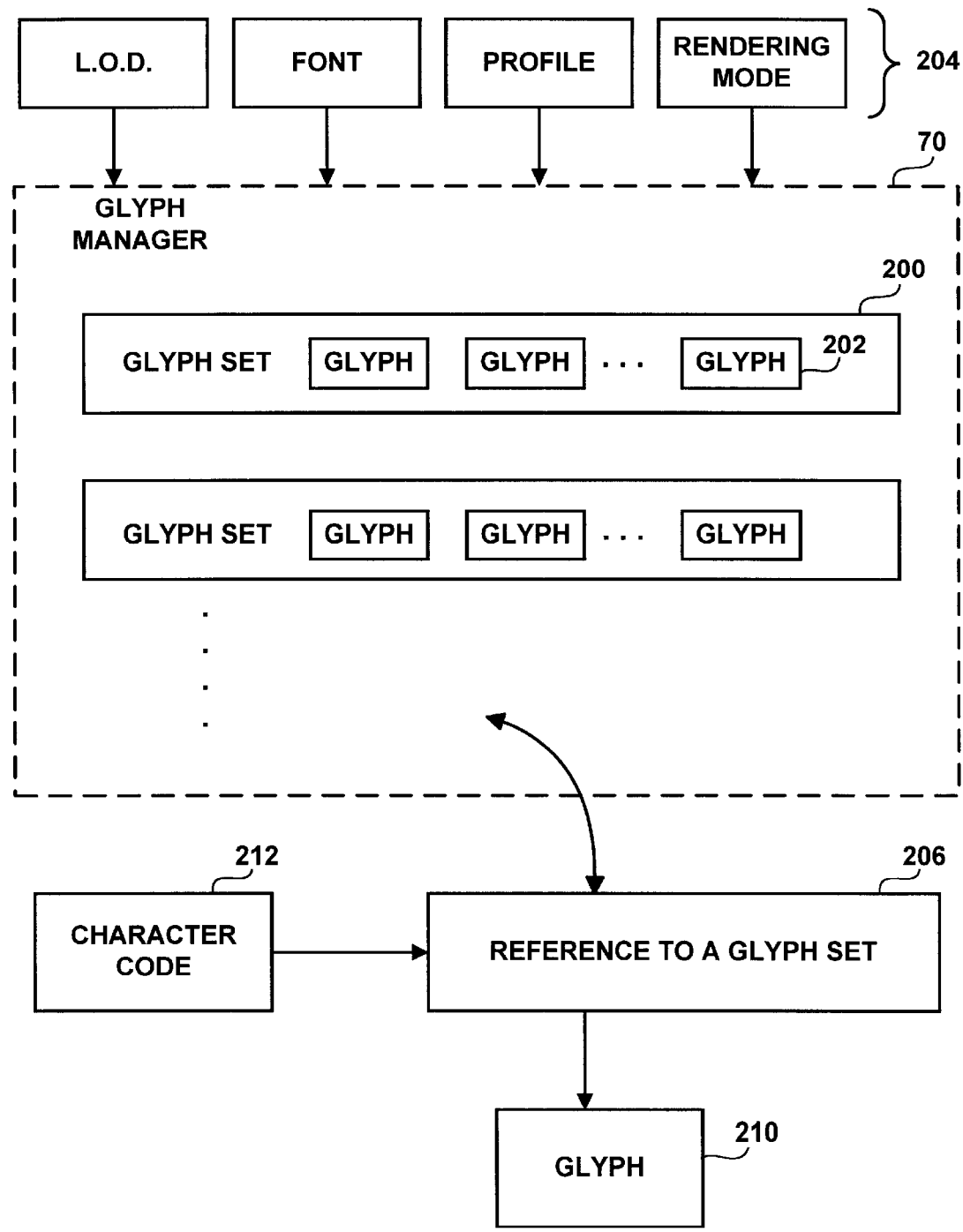
FIG. 4 is a data flow diagram of a glyph manager shown in FIG. 3.

Referring now to FIG. 4, the glyph manager 70 stores glyphs 202 in glyph sets 70. An indication of a font, profile, rendering mode and LOD 204 identify a glyph set. In response to an indication of a font, profile, rendering mode and LOD, a glyph set 200 may be identified or maintained by the glyph manager. A reference or pointer to a glyph set may be returned by the glyph manager as shown at 206. To retrieve a glyph 210 from a glyph set 200, a character code 212 and the reference 206 to the glyph set are used. In one embodiment, the glyph set may be implemented as an object having a draw method that is passed an indication of a character code. Given the character code, the glyph set draws the glyph for the indicated character code. In a computer system such as a described above, in particular the Infinite Reality computer system, an entire glyph set 200 may be loaded into a memory associated with the graphics processor in order to accelerate rendering.

Properties are values which control the appearance and position of nodes in a scene graph. These values may be animated over time in a video presentation. There are several kinds of properties that may be associated with an object. Material properties are used to color an object. Shadow properties define the color and nature of an object's shadows. Border properties define the material and nature of an objects order, such as an outline. Effect properties define special effect attributes for rendering the object. Font properties define the aspects of the font used for character objects. Transform properties define various spatial transforms applied to the object. Layout properties define how objects relate to each other. Some properties, as noted above, affect the glyph set in which a character belongs. Other properties, such as those that define affine transforms affect the projection of a rendered object onto a display. Using OpenGL, these properties may be used to alter the model-view matrix.

Example material properties include color, opacity, shininess, texture pattern or image and texture mapping. Example shadow properties include the type of shadow, shadow material, angle of the shadow, distance from the object, and softness of the shadow. Example border properties include the type, such as outline or bevel, material, thickness and bevel smoothness. Example effect properties include delay indicating a time of wait until a next object is drawn, and any transition used to place the object on a screen, such as a dissolve or wipe. Example font properties include the font family such as Times or Helvetica, the font size, and style attributes such as bold, italic and underline. Example transform properties include the position relative to any parent object in the scene graph, the center of rotation and scaling with respect to the position, and amount of scaling and amount of rotation. Example layout properties include the amount of additional kern between objects, the amount of additional leading above objects and the justification or alignment.

For each type of property, a property stack is maintained. The list of stacks 72 is maintained as part of the root object 52. A stack is used to track the active properties for a node during traversal of the scene graph. Each node in the scene graph may have a property list such as shown at 74. A property list is a list of properties and associated values for each node which differ from default values in the property stacks associated with the root node. If a property is not in the property list of a given node, the property is inherited by that node from any ancestor node in the scene graph. If a node has a property in its property list, that node overrides the property value from the ancestor nodes. For example, property list 74 includes values 76 for font height and 78 for opacity. However, it does not include a value for the property font type. Therefore, node 61 inherits its font type from ancestor nodes text box 54 or root 52, but overrides the font height and opacity values.

A property value may be defined by a function based on a normalized representation of time that refers to the duration of the scene graph. In particular, the property values may be defined as a function of time, where time ranges in value from zero to one. This function may be represented by a Bézier curve Different values may be associated with the property over time to permit animation of the property. In a graph of a property value, where a horizontal axis represents time and a vertical axis represents a value, a constant value is represented by a horizontal line. A graphical user interface that displays the Bézier curve may permit a user to manipulate the curve to change these values.

As mentioned above, when processing the scene graph either to position characters or to render characters, the properties associated with a node are pushed onto the property stacks when processing that node and its children. After completion of the processing of a node and its children, the properties are popped from the property stacks.

In order to process a scene graph and in order to display its contents, the scene graph is traversed using a simple "in order" or "depth first" traversal. The graph may be first traversed to perform a layout function, i.e., positioning of characters. The graph may be next traversed to draw each character on the display or to an image buffer. A process for traversing the tree to identify the property values for each node in the tree will be described now in connection with FIG. 5.

FIG. 5 illustrates pseudocode for implementing this procedure. The procedure begins with processing of the root node, which has associated property stacks. The root node its own property list that defines system-wide default values. The property list also may be changed to provide values which differ from system-wide default values. For each property in the node's property list, the property is pushed onto the corresponding property stack in step 50. The node is then processed, to either layout or draw the contents of the node in step 52. For each child of the current node, as determined in step 54, this procedure is recursively performed as identified at 56. After completing processing of all the child nodes, for each property in the property list of the current node, as determined in 58, the property values are popped from the corresponding property stacks in step 60. This process of referencing properties by a property stack during tree traversal implements property inheritance and overriding.

In order to display the contents of a text box, two functions are performed. First, the text is laid out in a plane or space defined by its parent node, by selecting position for each character based on the spatial properties of the character. Processes for laying out characters in two-dimensions are well-known in the art. The characters are then drawn in their selected positions. The plane or space into which the characters are drawn may be transformed when displayed. The layout and drawing operations may be performed for the characters separately or for all characters in a string at one time.

Figure 6:
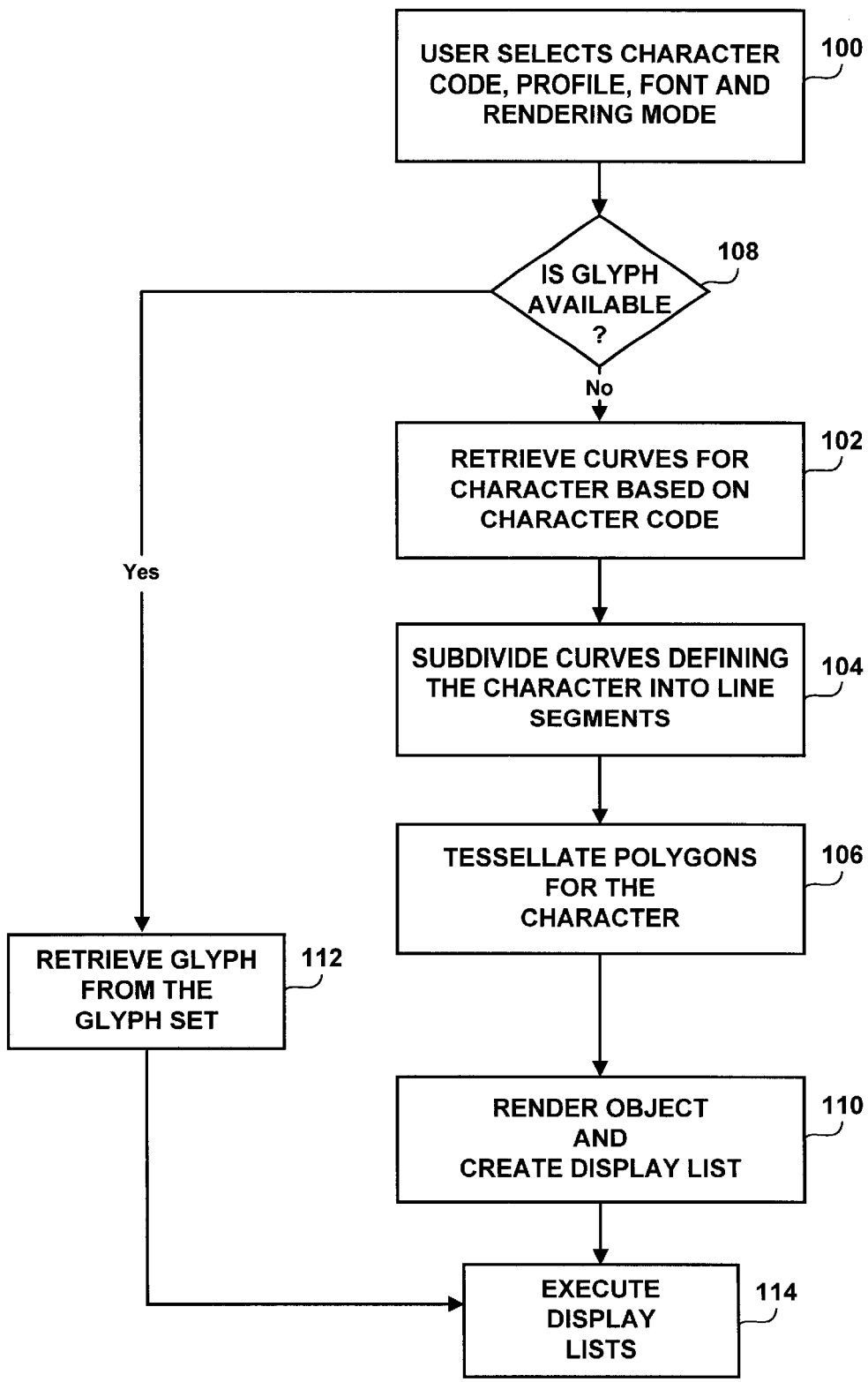
FIG. 6 is a flow chart describing how a character is rendered.

The drawing of three-dimensional text characters represented by polygons will now be described in connection with FIG. 6. FIG. 6 is a flow chart describing the process of rendering a character. This process begins by a user specifying a character code, font, profile and rendering mode in step 100. The font, profiled and rendering mode may be selected from the property stack at the node for this character. As described above, the character node defines a character code representing the character, such as a Unicode value, a standard maintained by the Unicode consortium, an ASCII code, or a code defined in ISO-8859-1 (Latin), ISO-8859-7 (Greek), ISO 8859-5 (Cyrillic), ISO-8859-8 (Hebrew), or ISO 8859-6 (Arabic), or any other character code standard. Type1 fonts (from Adobe Systems, Inc.), TrueType fonts (from Microsoft Corporation) and Bitstream fonts (from Bitstream, Inc.), or any other font defined by contour definitions, for example by using Bézier splines, may be used.

A glyph may be available for the specified character, font, profile an rendering mode in the glyph manager 70. If it is determined in step 108 that a glyph is available in the glyph manager for the specified character, the glyph is retrieved in step 112 from the glyph manager. The glyph is then executed in step 114.

If a glyph is not available for the specified character, font, profile and rendering mode, the contours or curves defining the character in the specified font are retrieved using the specified character code, in step 102.

The curves defining a character are then subdivided in step 104 into a set of line segments. The subdivision of Bézier curves is described, for example, in *Computer Graphics Principles and Practices,* Second Edition, by James D. Foley, Andries van Dam, Stephen Finer and John Hughes, Addison-Wesley Publishing Company, 1990, pages 507–511, which is hereby incorporated by reference. The set of line segments define an outline of the character.

Changes in the height and size of a character may affect the number of polygons created by tessellation (in the next step 106 in FIG. 6) in order to make the resulting image look smooth. In particular, small characters have a low level of detail and few polygons. Large characters have a high level of detail and many polygons. The level of detail may be increased by recursively subdividing the line segments according to a desired level of detail. Such recursive subdivision often is used to improve accuracy of an approximation of a polygon to a surface. Such subdivision techniques are described in the *OpenGL Programming Guide,* Version 1.1, Second Edition, pp. 86–89, which is hereby incorporated by reference. A particular embodiment for determining a desired level of detail is described in more detail below in connection with FIG. 7. The line segments obtained by subdividing the curves are continually subdivided if two adjacent line segments have an angle that exceeds a threshold determined by the desired level of detail.

The polygons defining the outline of a character are then tesselated in step 106. Tessellation is a function provided by the OpenGL application programming interface. This function may be used with a parameter "glu_tess_tolerance," which is set to zero. Tessellation fills spaces defined by the line segments with polygons, typically triangles, and lines, to provide a set of polygons defining a shape of a character. The set of polygons resulting from tessellation then may be rendered in step 108. When rendered using OpenGL, a display list may be created and stored in the glyph manager. The display list may be executed in step 114.

Prior to tessellating the polygons defining a character, a two-dimensional outline of a character may be transformed into a solid three-dimensional object by applying a profile to the character outline. A profile is defined in a plane perpendicular to the plane of the two-dimensional outline. The computer system sweeps the profile along the character outline to produce a three-dimensional shape. These techniques of profiling and sweeping are standard three-dimensional modeling techniques. For example, a circular profile produces a three-dimensional tubular character after sweeping.

Figure 7:
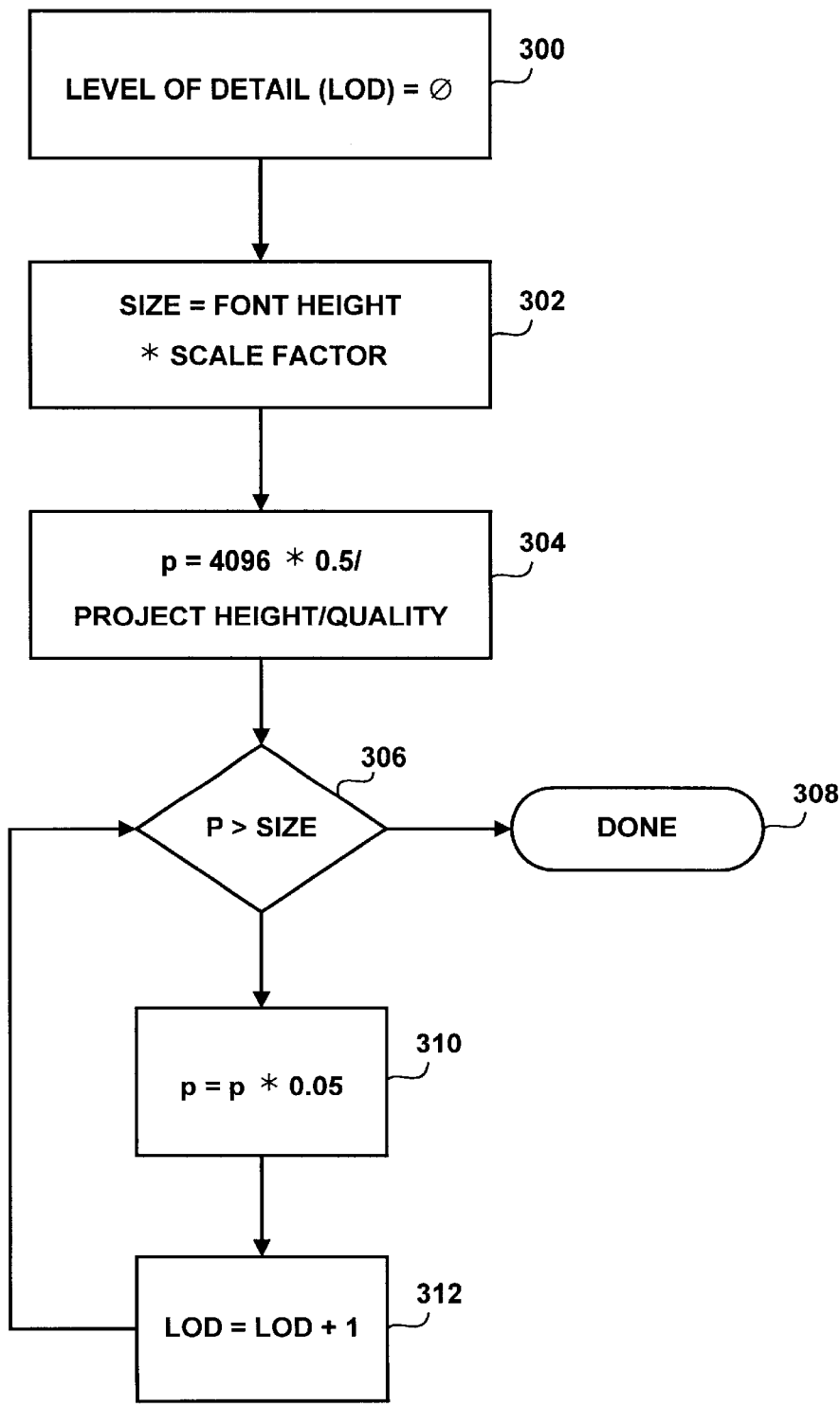
FIG. 7 is a flow chart describing how a level of detail is selected for defining a set of polygons to represent a character.
Figure 8:
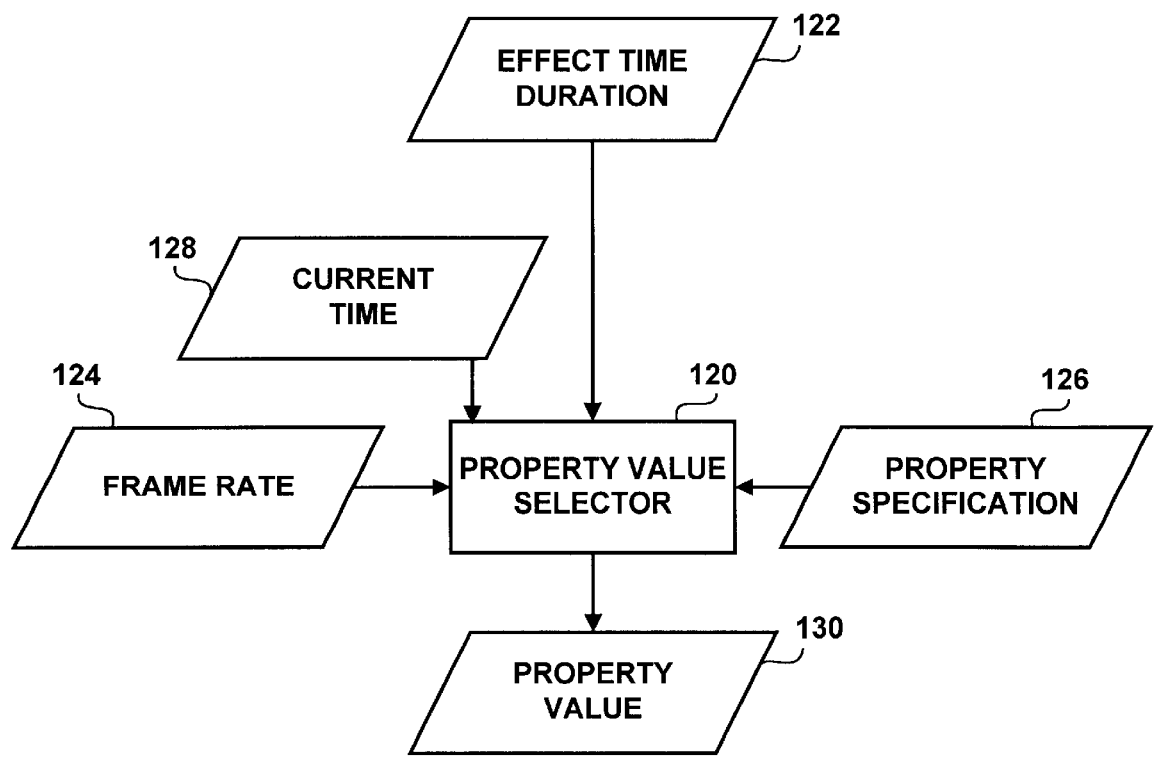
FIG. 8 is a data flow diagram illustrating how a property value is selected for a given frame of an effect.

Referring now to FIG. 7, the determination of the threshold used to control subdivision of line segments in step 104 of FIG. 6, is based on a value representing a level of detail. In particular, the tolerance value (T) is equal to two to the power of the level of detail (LOD) value ($T=2^{LOD}$). In this embodiment, level zero is the maximum level of detail. Increasing integers correspond to lower levels of detail. The tolerance depends on the size of the resulting image in pixels, the height of the font, relative to the project height, any scaling factor, and a user provided value of quality. This value may be provided as any value greater than zero, where one is a nominal quality, or default value.

In the embodiment shown in FIG. 7, the determination level of detail is based on the following assumptions; the font height is a value of zero to one and is relative to the project height; the project height is measured in pixels; and the scaling factor by which Bézier curves are input into the system is 4096. The scaling factor allows polygon vertex values to be two byte scaled integers.

A first step of computing the level of detail is setting the level of detail value to zero in step 300. A size value is then computed as the product of the font height and the scale factor in step 302. A value called "p" is the Bézier curve scaling factor, e.g., 4096, multiplied by one half, then divided by the project height, and then by the quality value in step 304. If the value p is greater than the size value, as determined in step 306, processing is completed as indicated at 308 and the current level of detail value is used to compute the tolerance for the subdivision process. Otherwise, the value p is multiplied by one half in step 310 and the level of detail value is incremented in step 312. Steps 306 through 312 repeat until the value p is greater than the size value.

It should be understood that other methods may be used to determined the tolerance to which the subdivision step of 104 uses, and that this invention is not limited to the example embodiment set forth herein.

As described above, the various properties for a scene may be animated over time. In order to determine a particular value to be used in a given image of a sequence of temporally related images, the property selected for example by using a property value selector shown at 120 in FIG. 8. An image may be a frame or a field. The property value selector receives an effect time duration 122 which is defined by an editor using for example the video editing system to apply the effect to one or more video tracks. The image rate of the associated video is also input at 124. The property value is defined by a property specification 126 which may be a Bézier curve having values associated with a time scale ranging from zero to one. The property value selector 120 multiplies the effect time duration by the image rate to determine the number of images over which the effect is applied. The ratio of the current time (in images with respect to a start image) to the total number of images in the effect defines a time value between zero and one which is used to identify a property value 130 according to the property specification 126. For any given image, property value 130 is used to define the displayed characters.

Figure 9:
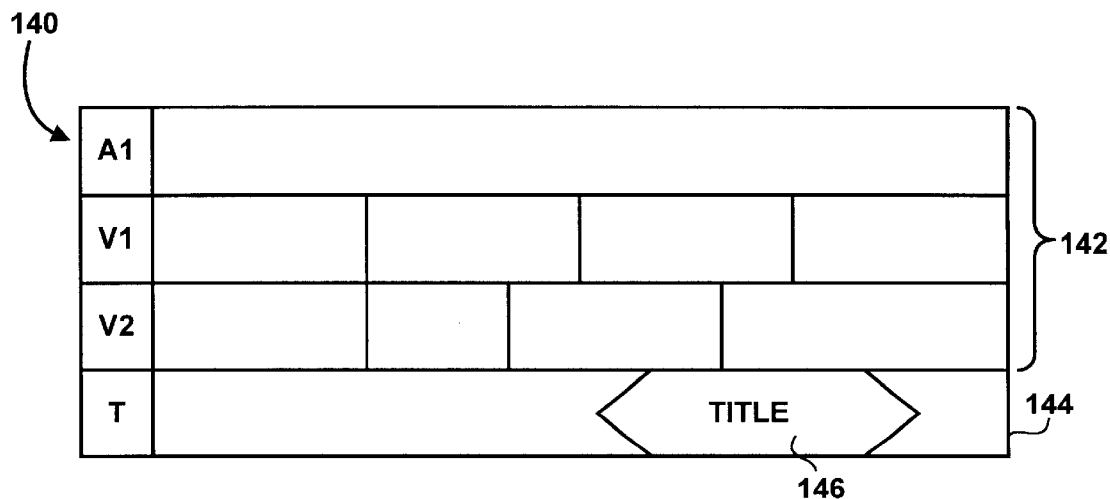
FIG. 9 is an illustration of a graphical user interface for a timeline.

Having now described the operation of the three-dimensional layout and rendering module 34 (FIG. 1), the graphical user interface 20 will now be described in more detail. It should be understood that the following is only an example interface and that many other user interfaces may be provided for editing text for use in rendering three-dimensional titling effects. A timeline 32 (FIG. 1) is shown in FIG. 9 at 140. The timeline may have one or more video or audio tracks 142 as is commonly provided in computer-based non-linear editing systems such as the Avid/1 Media Composer from Avid Technology, Inc. A titling track 144 also is provided to define titling effects or other character generation effects. A titling effect on the timeline, such as shown at 146, has a duration which may be adjusted by manipulation of the user interface using known techniques. The duration of the titling effect on the timeline interface may be maintained in a composition representing the program and may be used as described above in connection with FIG. 8.

Figure 10:
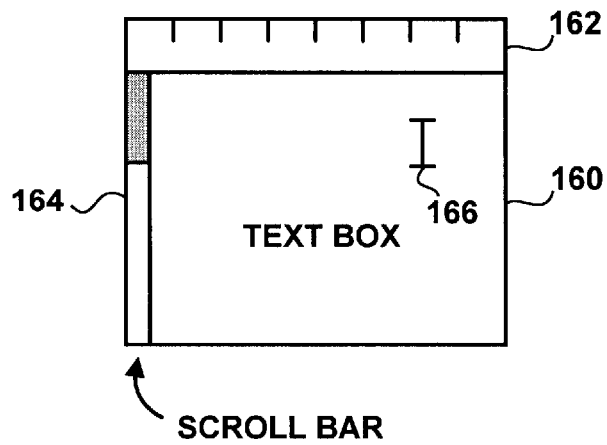
FIG. 10 is an illustration of a graphical user interface for editing and viewing three-dimensional characters.
Figure 11:
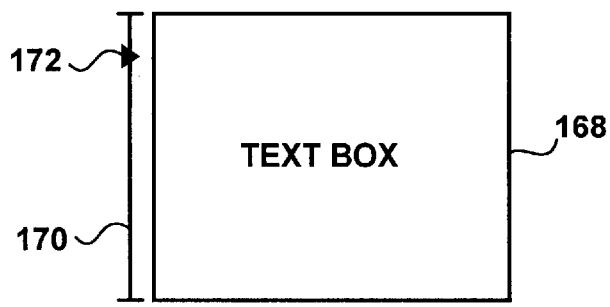
FIG. 11 is an illustration of a graphical user interface for viewing three-dimensional characters in roll animation.

When an icon for a text box is selected in the timeline shown in FIG. 9, an editing box may be provided to edit the text in the text box as shown in FIGS. 10 and 11. In particular, the graphical user interface for editing text in a text box may operate in two modes.

In a first mode, shown in FIG. 10, the text display area 160 is similar to a word processor. A ruler tool 162 may be used to identify spacing of the text. A scroll bar 164 may be provided to view text that does not fit within the text display area 160. A cursor 166 may be provided in this editor. The characters actually displayed in text display area 160 may be rendered using the three-dimensional techniques described above to provide a "what-you-see-is-what-you-get" (WYSIWYG) interface, without positioning in the text display area 160 that is effected by rolling or crawling. This mode may be activated by, for example, selecting the text display area 160 using a pointing device, such as a mouse.

In response to a user selecting an area outside of the text display area with the pointing device 160 or providing a predetermined input, such as a specified key on the keyboard, an alternate mode for the purpose of animation is shown, as illustrated in FIG. 11. In this mode, the display area 168 displays the text, with three-dimensional rendering as it appears at a selected time in the effect with spatial effects, such as rolling or crawling applied. The selected time in the effect is defined by a key frame control 170. The key frame control defines a range from zero to one over the effect. A point in time in the effect, to have rendered in the display 168, may be selected using a key frame indicator 172. Alternatively, the key frame control 170 may be horizontal or vertical in another position, or in another orientation, to allow key framing of a roll or crawl or other effect position.

Because a character is represented by a set of polygons instead of a bit-map, a character maybe manipulated using three-dimensional animation techniques. Animation properties that use a normalized scale over time permits animation that is independent of the spatial and temporal resolution of the video to which the animated characters are applied.

The storage of sets of polygons created from contours defining characters in a font defines a new representation of the font and allows new fonts to be created. The sets of polygons for characters of various fonts may be stored both to improve performance and for later retrieval to avoid recalculation.

Having now described a few embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A computer-implemented method for use in producing three-dimensional video animation of alphanumeric characters, comprising the steps of:
   interactively receiving data indicating an alphanumeric character;
   receiving data defining a three-dimensional model of the indicated alphanumeric character, a sequence of temporally related images, and properties defining three-dimensional attributes of the indicated alphanumeric character over the sequence of temporally related images;
   receiving data indicative of a selection of a user defining an image of the sequence of temporally related images and interactively rendering the indicated alphanumeric character on a display in the image of the sequence of temporally related images according to the received three-dimensional model and the received properties associated with the image of the sequence of temporally related images; and
   rendering the indicated alphanumeric character according to the received properties on a display over the sequence of temporally related images.

2. The method of claim 1, wherein interactively receiving data indicating an alphanumeric character comprises receiving data indicative of data input by a user indicating an alphanumeric character.

3. The method of claim 1, further comprising the step of providing two modes of operation, one with spatial effects and one without spatial effects.

4. The method of claim 1, wherein rendering the indicated alphanumeric character according to the received properties on a display over the sequence of temporally related images comprises rendering the indicated alphanumeric character in real time according to the received properties on a display over the sequence of temporally related images.

5. The method of claim 1, wherein receiving data indicative of a selection of a user defining an image of the sequence of temporally related images comprises receiving data indicative of a selection of a user defining a position along a normalized range of positions, the position having a correspondence to a sequence-position of the image within the sequence of temporally related images.

6. The method of claim 1, wherein receiving data defining a three-dimensional model of the indicated alphanumeric character comprises receiving a set of polygons defining a three-dimensional surface of the character, and wherein rendering the indicated alphanumeric character comprises rendering the set of polygons.

7. The method of claim 6, further comprising the steps of receiving an input defining an outline of the indicated alphanumeric character, and generating the set of polygons defining a surface of the character using the received outline and properties.

8. The method of claim 7, wherein the step of generating the set of polygons comprises the steps of:
   converting the curves into a set of connected line segments;
   tessellating the set of connected line segments to obtain the set of polygons.

9. The method of claim 8, wherein the step of converting the curves into a set of connected line segments comprises the step of converting the curves into a set of connected line segments in response to a value indicative of a desired level of detail.

10. The method of claim 9, wherein the step of converting the curves into a set of connected line segments in response to a value indicative of a desired level of detail comprises the step of recursively subdividing the line segments in response to the value indicative of a desired level of detail.

11. The method of claim 10, wherein the step of recursively subdividing the line segments in response to the value indicative of a desired level of detail comprises subdividing the line segments if two adjacent line segments have an angle that exceeds a threshold determined based on the value indicative of the desired level of detail.

12. The method of claim 11, wherein the step of subdividing the line segments if two adjacent line segments have an angle that exceeds a threshold comprises setting the threshold to be proportional to an exponential having an exponent proportional to the value indicative of the desired level of detail.

13. The method of claim 9, further comprising the step of determining the desired level of detail in response to at least a font height, a scale factor, a project height, and a specified value indicative of a measure of quality.

14. The method of claim 13, further comprising the step of receiving data from the user indicative of the specified value indicative of a measure of quality.

15. The method of claim 1 further comprising the step of providing the indicated alphanumeric character in a title in a video program.

16. The method of claim 7, wherein there is a correspondence between the rendered size of a character and the number of polygons.

17. The method of claim 7, wherein the number of polygons increases as the rendered size of a character increases.

18. The method of claim 1, wherein receiving data defining properties defining three-dimensional attributes of the indicated alphanumeric character over the sequence of temporally related images includes receiving data defining variation in three-dimensional attributes of the indicated alphanumeric character over the sequence of temporally related images.

19. A computer system for use in producing three-dimensional video animation of alphanumeric characters, the computer system comprising:
   means for interactively receiving data indicating an alphanumeric character;
   means for receiving data defining a three-dimensional model of the indicated alphanumeric character, a sequence of temporally related images, and properties defining three-dimensional attributes of the indicated alphanumeric character over the sequence of temporally related images;
   means for receiving data indicative of a selection of a user defining an image of the sequence of temporally related images and interactively rendering the indicated alphanumeric character on a display in the image of the sequence of temporally related images according to the received three-dimensional model and the received properties associated with the image of the sequence of temporally related images; and
   means for rendering the indicated alphanumeric character according to the received properties on a display over the sequence of temporally related images.

20. The system of claim 19, wherein the means for interactively receiving data indicating an alphanumeric character comprises means for receiving data indicative of data input by a user indicating an alphanumeric character.

21. The system of claim 19, further comprising means for providing two modes of operation, one with spatial effects and one without spatial effects.

22. The system of claim 19, wherein the means for rendering the indicated alphanumeric character according to the received properties on a display over the sequence of temporally related images comprises means for rendering the indicated alphanumeric character in real time according to the received properties on a display over the sequence of temporally related images.

23. The system of claim 19, wherein the means for receiving data indicative of a selection of a user defining an image of the sequence of temporally related images comprises means for receiving data indicative of a selection of a user defining a position along a normalized range of positions, the position having a correspondence to a sequence-position of the image within the sequence of temporally related images.

24. The system of claim 19, wherein the means for receiving data defining a three-dimensional model of the indicated alphanumeric character comprises means for receiving a set of polygons defining a three-dimensional surface of the character, and wherein the means for rendering the indicated alphanumeric character comprises means for rendering the set of polygons.

25. The system of claim 24, further comprising means for receiving an input defining an outline of the indicated alphanumeric character, and means for generating the set of polygons defining a surface of the character using the received outline and properties.

26. The system of claim 25, wherein the means for generating the set of polygons comprises:
   means for converting the curves into a set of connected line segments;
   means for tessellating the set of connected line segments to obtain the set of polygons.

27. The system of claim 26, wherein the means for converting the curves into a set of connected line segments comprises means for converting the curves into a set of connected line segments in response to a value indicative of a desired level of detail.

28. The system of claim 27, wherein the means for converting the curves into a set of connected line segments in response to a value indicative of a desired level of detail comprises means for recursively subdividing the line segments in response to the value indicative of a desired level of detail.

29. The system of claim 28, wherein the means for recursively subdividing the line segments in response to the value indicative of a desired level of detail comprises means for subdividing the line segments if two adjacent line segments have an angle that exceeds a threshold determined based on the value indicative of the desired level of detail.

30. The system of claim 29, wherein the means for subdividing the line segments if two adjacent line segments have an angle that exceeds a threshold comprises means for setting the threshold to be proportional to an exponential having an exponent proportional to the value indicative of the desired level of detail.

31. The system of claim 27, further comprising means for determining the desired level of detail in response to at least a font height, a scale factor, a project height, and a specified value indicative of a measure of quality.

32. The system of claim 31, further comprising means for receiving data from the user indicative of the specified value indicative of a measure of quality.

33. The system of claim 19, further comprising means for providing the indicated alphanumeric character in a title in a video program.

34. The system of claim 25, wherein there is a correspondence between the rendered size of a character and the number of polygons.

35. The system of claim 25, wherein the number of polygons increases as the rendered size of a character increases.

36. The system of claim 19, wherein means for receiving data defining properties defining three-dimensional attributes of the indicated alphanumeric character over the sequence of temporally related images includes means for receiving data defining variation in three-dimensional attributes of the indicated alphanumeric character over the sequence of temporally related images.

* * * * *